United States Patent [19]

Rioux

[11] Patent Number: 5,075,561
[45] Date of Patent: Dec. 24, 1991

[54] THREE DIMENSIONAL IMAGING DEVICE COMPRISING A LENS SYSTEM FOR SIMULTANEOUS MEASUREMENT OF A RANGE OF POINTS ON A TARGET SURFACE

[75] Inventor: Marc Rioux, Ottawa, Canada

[73] Assignee: National Research Council of Canada/Conseil National De Recherches du Canada, Ottawa, Canada

[21] Appl. No.: 538,011

[22] Filed: Jun. 13, 1990

[30] Foreign Application Priority Data

Aug. 24, 1989 [CA] Canada .................................. 609303

[51] Int. Cl.$^5$ ............................................ G01N 21/86
[52] U.S. Cl. .................................. 250/561; 250/201.8; 250/216; 356/376
[58] Field of Search ................... 250/561, 201.8, 201.6, 250/216; 356/376, 4

[56] References Cited

U.S. PATENT DOCUMENTS 4,560,863 12/1985 Matsumura et al. .............. 250/201.8
4,645,347 2/1987 Rioux .................................. 356/376

Primary Examiner—David C. Nelms
Assistant Examiner—T. Davenport

[57] ABSTRACT

A three dimensional imaging device has a converging lens system defining an optical axis, known as the Z direction. The imaging device also includes a position sensitive detector that has a series of pixels extending in at least a selected one of two mutually perpendicular X and Y directions both perpendicular to the Z direction. The lens system will simultaneously image a plurality of distributed points on a target surface onto the detector to generate first data on the coordinate of each point on the target surface in the X and/or Y direction. Also included in the system is a mask having a pair of apertures spaced apart from each other in the selected direction and respectively aligned with portions of the lens system for imaging discrete dots on the detector. The spacing between the dots generates second data on the coordinate of each point on the target surface in the Z direction. The device is modified in such a way as to cause a point on the target surface at a reference plane that would normally appear as a single focussed dot on the detector now to appear as a pair of spaced, substantially fully focussed dots. This modification takes the form of modifying the lens system such that a pair of spherical lens portions are rendered aspherical with respect to each other while each remains spherical with respect to itself. Another component of the system scans the pixels to extract data for all points on the target surface.

3 Claims, 3 Drawing Sheets

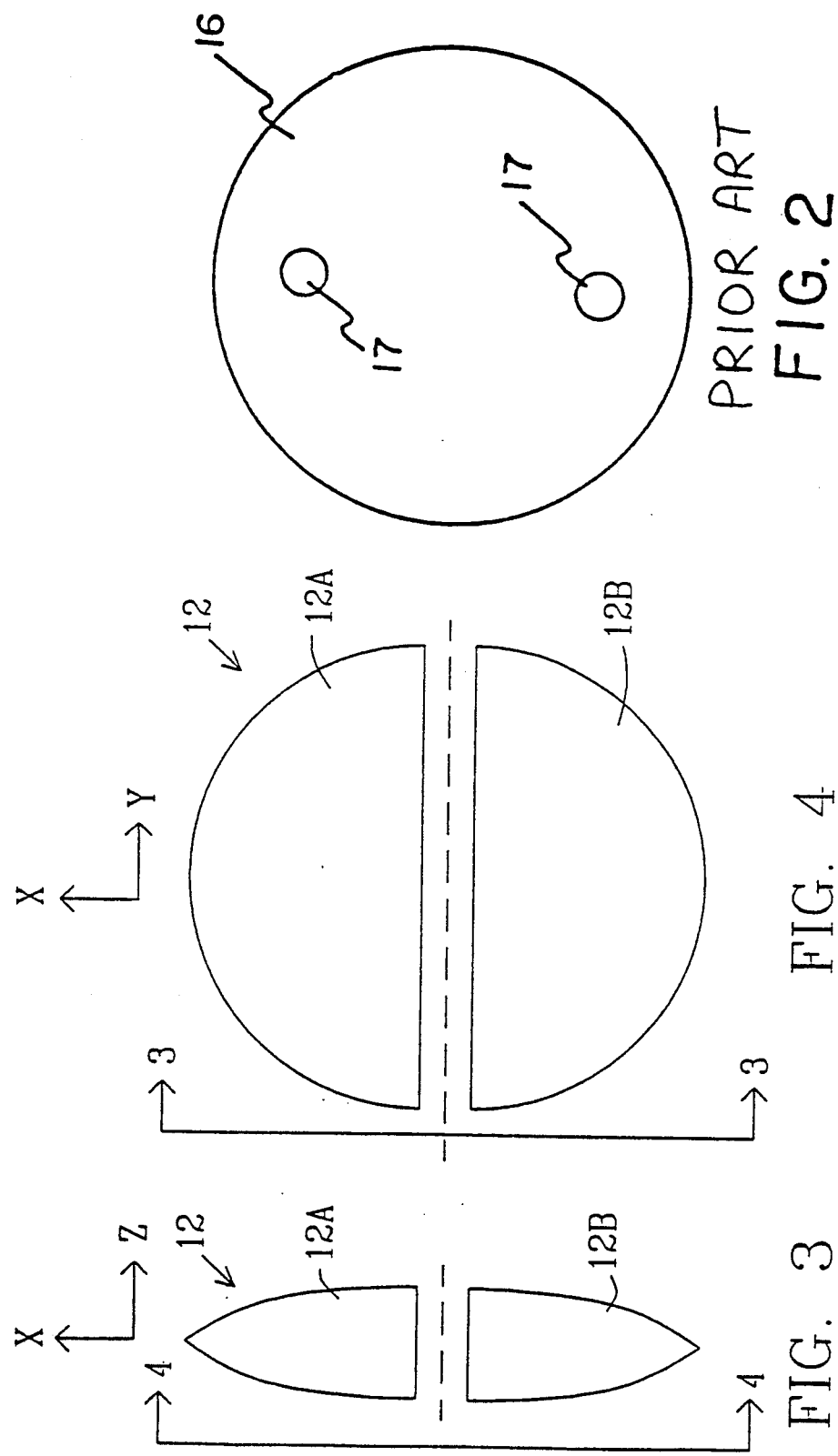

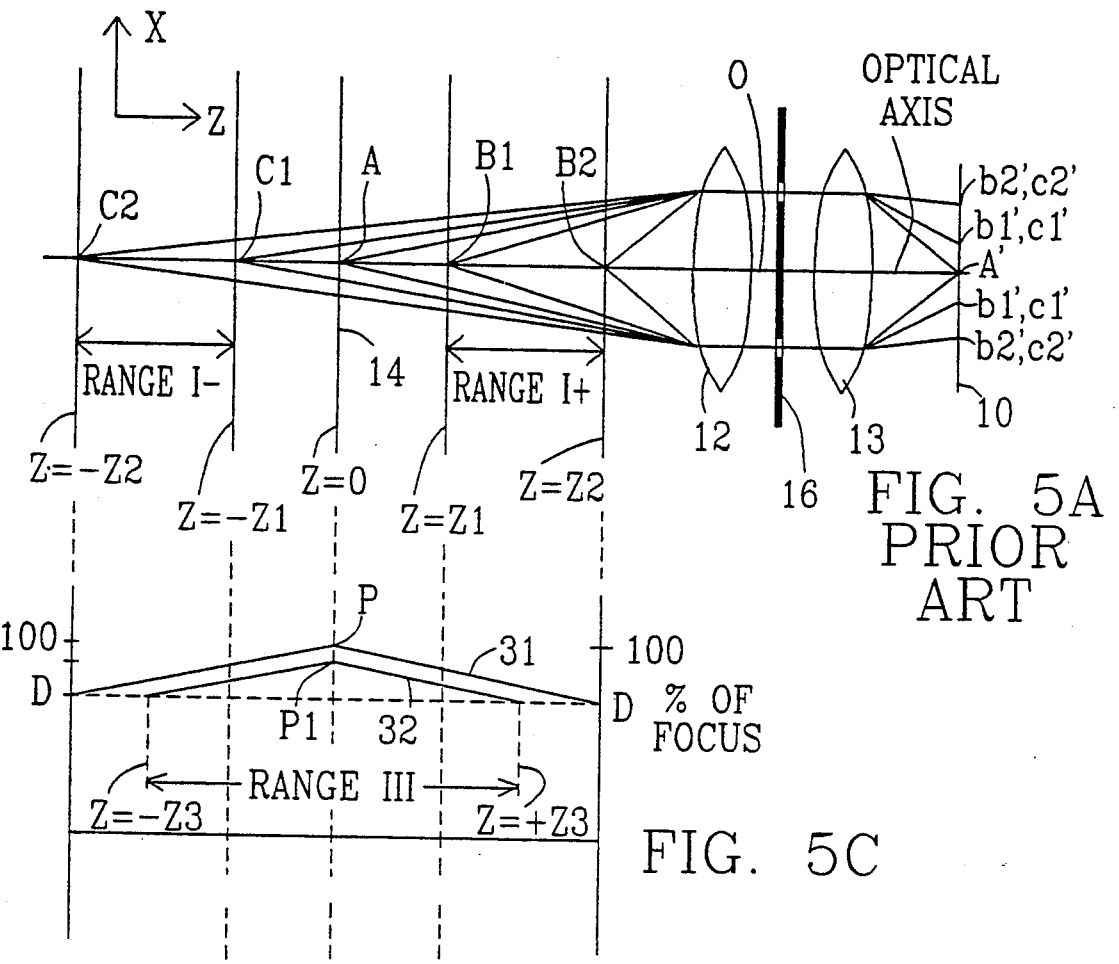
FIG. 5A PRIOR ART
FIG. 5C
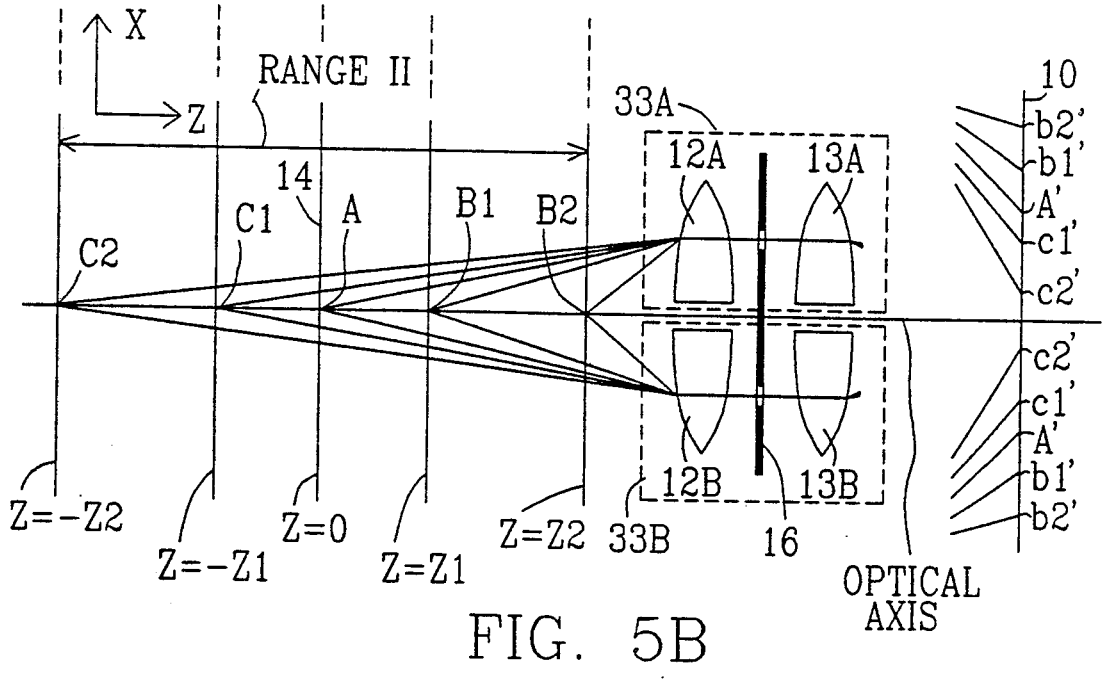
FIG. 5B

THREE DIMENSIONAL IMAGING DEVICE COMPRISING A LENS SYSTEM FOR SIMULTANEOUS MEASUREMENT OF A RANGE OF POINTS ON A TARGET SURFACE

FIELD OF THE INVENTION

The present invention relates to a three dimensional imaging device, that is to say a device for obtaining three dimensional data of a target surface, whether such data is displayed in three dimensional form or not. Indeed, the data may never be displayed as such, but may merely be used to control other equipment.

BACKGROUND OF THE INVENTION

Such an imaging device is useful for supplying three dimensional data to other instruments. For example, such data is valuable in the science of robotics, where objects are required to be identified on the basis of their three dimensional shape, and to be manipulated accordingly. Such data is also useful in monitoring the accuracy of the shape of a series of articles intended to be identical with each other. A three dimensional imaging device of this type is inexpensive to manufacture, high speed in operation, compact, and robust, and hence especially well adapted for use in robotics, e.g. for mounting on the end of a robot arm, although the utility of the present invention is by no means limited to robotics.

PRIOR ART

Examples of such imaging devices are disclosed in my U.S Pat. No. 4,645,347, issued Feb. 24, 1987. More specifically, my prior patent discloses an imaging device that has a converging lens system defining an optical axis, i.e. direction Z, together with a position sensitive light detector, e.g. a charge coupled device (CCD), that has a series of pixels extending in at least one direction X perpendicular to such Z direction. The detector is preferably bidimensional, i.e. has an array of pixels extending in mutually perpendicular directions, X and Y, both perpendicular to the Z direction.

The lens system serves to simultaneously image a plurality of distributed points on a target surface onto the detector, whereby to generate first data on the coordinate of each such point in the X direction, and, when the detector is bidimensional, also in the Y direction.

The system also employs a mask having a pair of apertures spaced apart from each other in the X direction for forming discrete images on the detector of each of the points. By virtue of the spacing between such images, they provide second data on the coordinate of each point in the Z direction. A computer scans the pixels to extract the first and second data for all the points and is hence able to determine the X, Y and Z coordinates of each point.

One of the limitations of this prior art system is its inability to work accurately at or near focus, i.e. with values of the Z coordinate close to zero.

Another of the limitations of this system is that, in order to avoid sign ambiguity, i.e. to distinguish between positive and negative values of a Z coordinate, it is necessary to apply a bias, for example using a biprism lens. However, using a biprism lens introduces an aberration in the lens system. Hence, while this approach corrects the sign ambiguity and the near focus problems, it reduces the effective operating range of the imaging device.

My U.S. Pat. No. 5,018,854 issued May 38, 1991 addresses these limitations by means of a color filter approach. However, this solution requires a color sensitive CCD and color filters to be placed in the aperture openings. Also only structured white light or coherent colored laser light can be used.

SUMMARY OF THE INVENTION

The present invention will address the limitations of the basic system without the additional hardware requirements and strict lighting requirements.

An object of the present invention is to achieve an improved depth of view, and, in particular, an ability to function effectively with values of the Z coordinate at or near zero, while maximizing the overall operating range.

Another object of the present invention is to modify the prior imaging device described above in such a manner as to enable negative values of the Z coordinate to be readily distinguished from positive values without the need for a biprism lens or color filters.

To these ends, the invention consists of an imaging device having a converging lens system defining an optical axis extending in a direction Z, and a position sensitive detector having a series of pixels extending in at least one of two mutually perpendicular directions X and Y both perpendicular to the Z direction. The lens system will simultaneously image a plurality of distributed points on a target surface onto the detector in at least a selected one of directions X and Y.

The device includes a mask having a pair of apertures spaced apart from each other in the selected direction and respectively aligned with portions of the lens system for imaging discrete dots on the detector of each of the points, whereby to generate, by means of the spacing between the dots, second data on the coordinate of each point in the direction Z. The device, e.g. the lens system, can be so modified as to cause a point on the target surface at a reference plane ($Z=0$) that would appear as a single focussed dot on the detector now to appear as a pair of spaced, substantially fully focussed dots. The lens system can be modified to achieve this separation of the imaged pair of dots by ensuring that the lens portions are aspherical with respect to each other while each portion remains spherical with respect to itself. This asphericality can be introduced into the lens system by displacing potions of a spherical lens system relative to each other.

Means for scanning the pixels to extract the first and second data for all the points will be included in the system.

BRIEF DESCRIPTION OF THE DRAWINGS

Embodiments of the invention are illustrated by way of example in the accompanying drawings, in which:

FIG. 2 is a section on the line 2—2 in FIG. 1;

FIG. 3 shows a lens which is cut and displaced in accordance with an embodiment of the invention, being a view in the line 3—3 in FIG. 4;

FIG. 4 is a section on the line 4—4 in FIG. 3;

FIG. 5A is a representation of the prior art operating range;

FIG. 5B is a representation of the operating range for the new lens system in accordance with an embodiment of the invention; and FIG. 5C is a graphical representation of focus versus distance from the centre line, common to both a prior art approach and to the embodiment of the invention.

DESCRIPTION OF THE PREFERRED EMBODIMENTS

Figure 1:
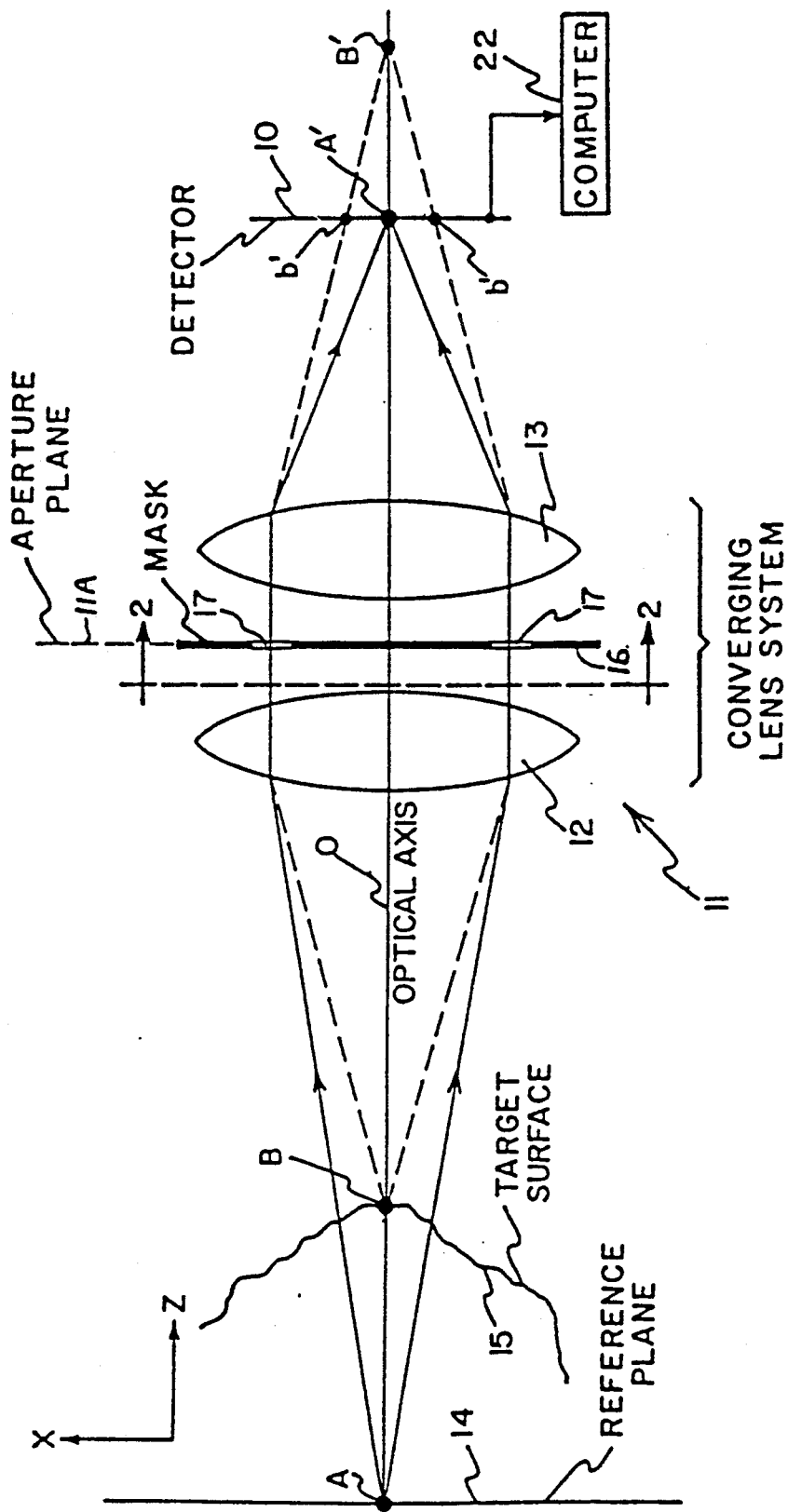
FIG. 1 shows the basic elements of a prior art imaging device.

FIGS. 1 and 2 illustrate a prior art approach to a three dimensional imaging device. FIG. 1 shows a bidimensional CCD (charge coupled device) detector 10 of the type commonly employed in television cameras. A converging lens system 11 is assumed to consist of two lenses 12 and 13. In reality, especially since a wide angle lens will normally be preferred, each of the lenses 12 and 13 will itself consist of a group of lenses. Reference numeral 14 designates a reference plane and 15 is an object under study, i.e. the target surface. The converging lens system 11 will focus a point A at the intersection of the reference plane 14 and the optical axis O at a point A' on the detector 10.

However, a point B on the target surface 15 and also on the axis O while having a positive Z coordinate, will theoretically be focussed at a point B', beyond the detector 10. In practice, the image of the point B will appear as a large, unfocussed, circular area on the detector 10 between points b'.

However, a mask 16 is associated with the lens system and is preferably located in, or as near as practicable to, the aperture plane 11A of the lens system, i.e. the plane in which vignetting is a minimum. In practice, a typical camera lens system with a normal adjustable aperture will be used, in which case the mask will preferably be located in close proximity to this aperture.

This mask 16, as seen in FIG. 2, has a pair of circular apertures 17 through which light can pass, the remainder of the mask being opaque. The effect of the use of the mask 16 is to cause the detector 10 to receive at the points b' two small discrete dots or images of the point B.

The distance between these two illuminated dots b' is a function of the distance Z of the point B from the reference plane 14. The detector 10 thus has the needed information of the Z coordinate of each point within its field of view in the X and Y directions. In a computer 22 to which the detector 10 is connected, the spacing between the points b' is measured to represent the Z coordinate for each point B, while the centre point between the points b', as calculated by the computer, represents the X and Y coordinates for the point B. This information is extracted in the usual way by electrically scanning the pixels of the detector 10. More specifically, the scan lines of the detector 10 will be oriented parallel to the mask aperture axis, i.e. the line between the apertures 17, which line extends in the X direction. The horizontal scanning of the detector will produce a signal that will be digitally processed line by line. The position of the geometrical centre (X and Y coordinates) and the distance between the two points b' (Z coordinate) can then readily be extracted in real time. This prior art approach illustrated by FIG. 1 and FIG. 2 is detailed further in my U.S Pat. No. 4,645,347, issued Feb. 24, 1987.

One lens of the plural lens system as proposed in this embodiment of the invention is illustrated in FIGS. 3, 4 and 5B. Each of the lenses 12 and 13 having spherical surfaces is cut in half in the plane defined by the Y and Z directions. The two halves 12A, 12B, or 13A, 13B are moved apart, or together, to achieve a different spacing in the X direction, i.e. a spacing that is different from the spacing of these portions of the lenses prior to cutting. The two lens system portions, shown in FIG. 5B as 33A and 33B, thus remain each equivalent in itself to a portion of a spherical lens system, while the portion 33A is aspherical in respect to the portion 33B. Since the aperture mask 16 is used in the complete system of FIG. 5B, and hence only the outermost parts of the lens portions are used, there is no restriction on the treatment given to those inactive parts of the lens system that are not aligned with the apertures 17. Hence the type and location of the separation can vary widely, the only requirement being that the cut does not interfere with the circular apertures 17 in the mask 16. The drawings show the separation of the lens portions 33A, 33B on an exaggerated scale for ease of illustration. In practice, the portions will typically be separated by about 300 to 700 $\mu$m. The system will work properly, albeit not as well, when only one of a series of lenses, i e. only the lens 12 or the lens 13, is cut and moved.

In fact a completely new lens system can be designed with a built in offset, i.e. to produce an asphericality between the active parts of the two lens system portions that align with the two apertures, while each such part retains its individual sphericality, i.e. remains spherical with respect to itself. This offset must be in the X direction for accurate optical characteristics. If the lens portions were tilted, relative to the X direction, i.e. about the Y axis, distortion would result in the detector image.

In the prior art system of FIG. 1, the operation of which is illustrated in FIG. 5A, point A, located on the reference plane 14, here shown as $Z=0$, is focused as a point A' on the detector 10. A point B1, at $Z=Z1$, is imaged as two small discrete dots b1' equidistant from the optical axis O, due to the aperture mask 16. A point B2, at $Z=Z2$, is imaged as two small discrete dots b2'. In the negative direction, a point C1, at $Z=-Z1$, is imaged as two small discrete dots c1'. Similarly a point C2, at $Z=-Z2$, is imaged at c2'. The distance between each pair of small discrete dots is a function of the Z dimension of the originating point, as disclosed in the prior art description.

Notice that points B1/C1 and points B2/C2 are imaged at the same points on the detector plate, i.e. b1'/c1' and b2'/c2' are coincident. Thus, without modification through the use of color filters (as proposed in my U.S. Pat. No. 5,018,854 issued May 28, 1991, or a biprism lens system (as proposed in FIG. 4 of my U.S. Pat. No. 4,645,347, issued Feb. 24, 1987), there is no way of differentiating positive from negative Z measurements.

An important feature of the present invention is related to the operating range of the imaging system. The range in the illustrated prior art system, FIG. 5A, is either I+ or I−, but not both except with additional equipment, for the reasons previously discussed. In the region between $Z=0$ and $Z=-Z1$, the imaged discrete dots either overlap each other or are too close to each other for effective measurement. As a result, accurate Z dimension data in the region around $Z=0$ cannot be extracted. For ease of illustration, FIG. 5A is not drawn to scale, i.e. the pair of discrete dots b1' are shown well separated. However as the point of interest on the target surface approaches $Z=0$ from $Z=\pm Z1$, the imaged pair in fact become very close and eventually overlap. The minimum separation required for accurate measurement of the space between a pair of discrete dots is approximately 10 pixels, each pixel being typically 15 $\mu$m in diameter. As a result the minimum distance between a pair of dots is typically 150 $\mu$m. In the system of FIG. 5B the points that are the closest together, i.e. the pair of dots $c2'$, still remain far enough apart to make an accurate measurement.

Functional characteristics of the system define the limit specified in FIG. 5A by the $Z=\pm Z2$ planes. Typically this limit is established by the tolerable defocus, specified by D in FIG. 5C. The peak P of the curve 31 defines the 100%, in-focus point, specifically located on the reference plane 14. Moving the point of interest on the target surface away in either the positive or negative Z direction decreases the degree of focus. In practice, a degree of defocus will be acceptable to the computer, and this is given as a limit D. Notice that curve 31 represents the relationship for both systems illustrated in FIG. 5A and FIG. 5B. Curve 32 is used to illustrate the imaging relationship for the prior art approach disclosed in FIG. 4 of my U.S. Pat. No. 4,645,347, issued Feb. 24, 1987. This system needs a biprism or axicon lens which significantly reduces optical imaging quality because it introduces an asphericality of each of the individual lens portions, which results in an aberration in the lens system that prevents the images on the detector ever being completely in focus. Hence curve 32 at $Z=0$ has a peak P1 that is less than P, from which it follows that the curve 32 crosses the tolerable defocus level D at locations $Z=\pm Z3$ which define the usable limits of the range III for this system.

In FIG. 5B (where the detector 10 is shown for clarity on an enlarged scale) point A is imaged as two small discrete dots $A'$ on the detector plate 10. This bias is introduced due to the separation of the lens parts 12A, 12B and 13A, 13B. Point B1 is imaged as the $b1'$ pair, to the outside of $A'$. Point B2 is imaged as the $b2'$ pair, to the outside of $b1'$. In the negative Z direction, point C1 is imaged as the $c1'$ pair, to the inside of $A'$. Point C2 is imaged as the $c2'$ pair, to the inside of $c1'$. This system provides a complete operating range from $Z=-Z2$ to $Z=Z2$, i.e. range II. This enables exploitation of the previously unusable zone between $Z=-Z1$ and $Z=Z1$, because the system introduces a natural bias. This results in all points in the positive range of $Z=0$ to $Z=Z2$ being imaged with the acceptable limits of tolerable focus as a pair of discrete dots outside the $A'$ offset, while all points in the negative range of $Z=0$ to $Z=-Z2$ are focused as a pair of discrete dots situated inside the $A'$ offset.

As mentioned above, one prior art method used to attain this operating range is through the use of color filters. In this prior method the sign ambiguity problem and the achievement of a wide operating range were both dealt with by placing color filters in the aperture openings 17 of the mask 16.

The present invention has the advantage over this color filter approach that no restriction exists for the type of lighting used. In the color case it is necessary to project structured white light or to use coherent colored lasers for proper operation of the system, while in the present invention any form of lighting is sufficient, including ambient. Also, in the colored filter method there is the additional requirement for a color sensitive CCD and color filter hardware.

In the other prior art method disclosed in FIG. 4 in my U.S Pat. No. 4,645,347, issued Feb. 24, 1987, the sign ambiguity problem was avoided. However, a biprism or axicon lens was necessary. While such lens also avoided the problem of operating in the range near $Z=0$, it had the disadvantage of reducing the overall operating range as shown by the curve 32. The present invention has the advantage of retaining in a simple manner a full and complete operating range, unambiguous in sign from $Z=-Z2$ to $Z=+Z2$.

I claim:

1. An imaging device having a converging lens system defining an optical axis extending in a direction Z, and a position sensitive detector located at the focal plane of said lens system and having a series of pixels extending in at least one of two mutually perpendicular directions X and Y both perpendicular to said direction Z, said lens system serving to simultaneously image a plurality of distributed points on a target surface onto the detector to generate first data on the coordinate of each said point in at least a selected one of directions X and Y; a mask having a pair of apertures spaced apart from each other in said selected direction and respectively aligned with portions of the lens system for imaging discrete dots on the detector of each said point, whereby to generate, by means of the spacing between said dots, second data on the coordinate of each said point in the direction Z; and means for scanning said pixels to extract said first and second data for all said points; said lens portions being modified to be aspherical with respect to each other while each portion is spherical with respect to itself whereby a point on the target surface at a reference plane will generate on the detector a pair of spaced-apart, substantially fully focused dots, and point on the target surface displaced within an operating range extending uninterruptedly both positively and negatively from said reference plane in the direction Z will each generate on the detector a further pair of spaced-apart dots, each such further pair being different from all the other pairs, and each dot of the further pairs being defocused no more than a predetermined degree of defocus tolerable at the detector, the spherical nature of each lens portion with respect to itself causing the extent of said operating range to be limited only by said tolerable degree of defocus.

2. An imaging device according to claim 1, wherein said lens system is a spherical lens system and said lens portions are displaced relative to each other in said selected direction to achieve their aspherical nature relative to each other.

3. An imaging device according to claim 1, wherein the detector has pixels extending in both said directions X and Y whereby said first data includes the coordinates of each said point on the target surface in both said directions X and Y.

* * * * *